July 8, 1941.　　　　E. LINCKH ET AL　　　　2,248,099
PRODUCTION OF HYDROCARBONS FROM MIXTURES
OF CARBON MONOXIDE AND HYDROGEN
Filed May 29, 1937
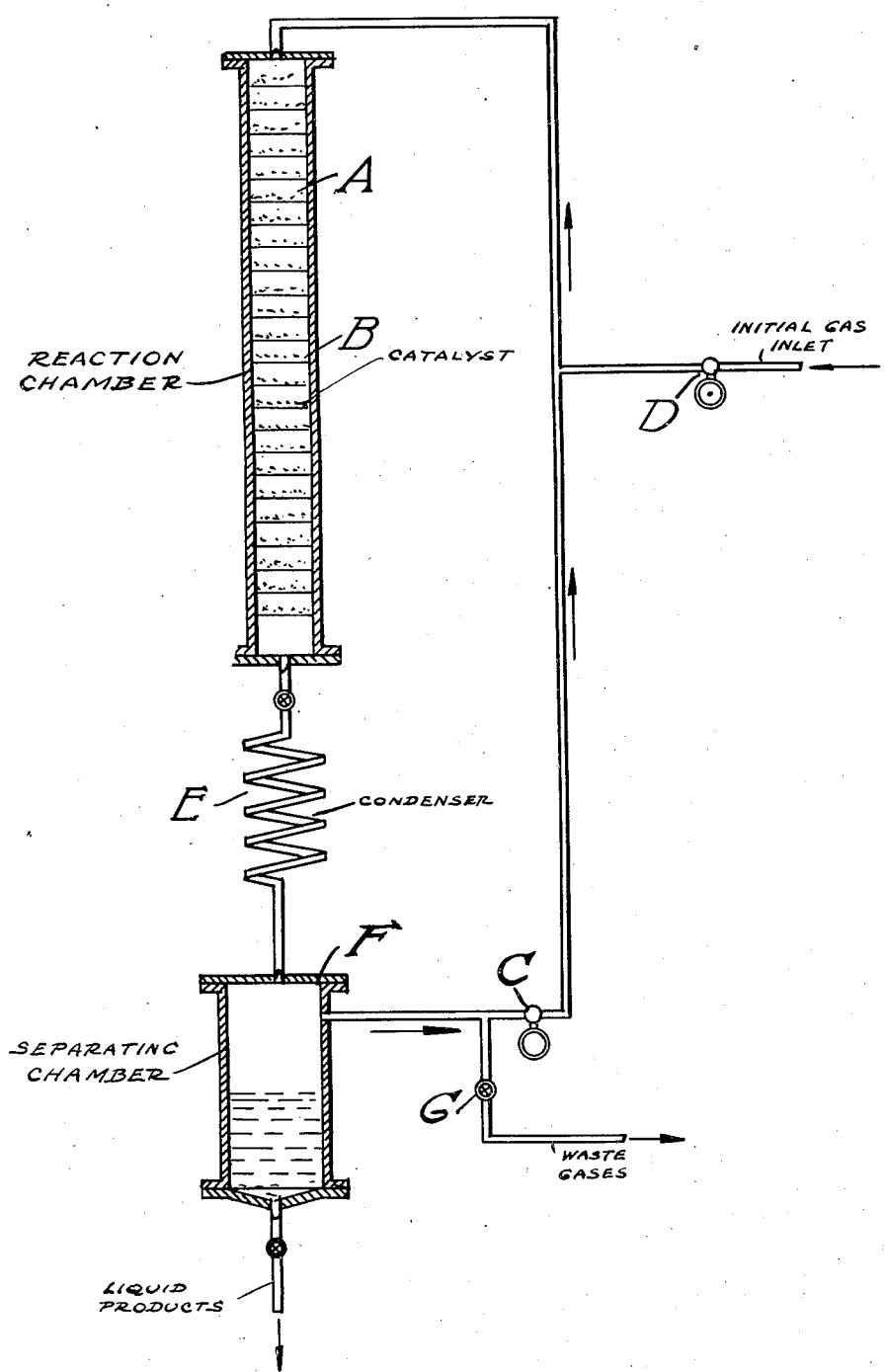

Patented July 8, 1941

2,248,099

UNITED STATES PATENT OFFICE 2,248,099

PRODUCTION OF HYDROCARBONS FROM MIXTURES OF CARBON MONOXIDE AND HYDROGEN

Eduard Linckh and Fritz Winkler, Ludwigshafen-on-the-Rhine, Germany, assignors, by mesne assignments, to William E. Currie, New York, N. Y.

Application May 29, 1937, Serial No. 145,580
In Germany July 1, 1936

3 Claims. (Cl. 260—449)

The present invention relates to the production of hydrocarbons containing more than one carbon atom in the molecule, in particular liquid hydrocarbons, from carbon monoxide and hydrogen.

In the conversion of carbon monoxide with hydrogen under superatmospheric pressures to form such hydrocarbons, local overheating is liable to take place since the reaction is exothermic and the amount of the substances reacting per unit of space and time is considerable. Such overheating leads to decomposition of the carbon monoxide into carbon dioxide and carbon, conjointly with a strong formation of methane, especially when using catalysts containing iron, nickel or cobalt, and this may readily lead to stoppage of the plant.

The use of diluent or accompanying gases in such reactions is known. However, if nitrogen or methane or any other gas having a low liquefaction temperature is employed as the accompanying gas, the portion of the recirculated gas not capable of entering into reaction becomes so large after some time, in view of the unavoidable formation of methane, that measures are necessary in order to lower its concentration, but this is difficult with the said gases since methane cannot be easily liquefied and therefore its removal would necessitate an intensive cooling of a considerable portion of the circulating gases.

However, when using carbon dioxide as the accompanying gas, these difficulties are reduced considerably and a very high, almost theoretical yield of hydrocarbons, liquid at ordinary temperature, and of their oxygen-containing derivatives is obtained. In this manner the desired concentration of the components capable of conversion may be maintained in the gas made up from the recirculated gas and the fresh gas for a long time, even if methane is continually formed, without resorting to withdrawal of large portions of the exit gas, by removing step by step the initially added carbon dioxide which may be easily affected on account of the high solubility of carbon dioxide in water under superatmospheric pressures.

The advantages in the use of carbon dioxide are still more pronounced if carbon monoxide is employed in a large proportion with respect to the hydrogen, since with such a gas the conversion may proceed according to the equations given below with only a very restricted formation of methane. Accordingly, the difficultly removable accompanying gases are present in a considerably smaller amount than with gases containing only small quantities of carbon monoxide and without addition of carbon dioxide as an accompanying gas, and consequently the exit gas may be recirculated much longer than with an excess of hydrogen and the use of other accompanying gases. The amount of the accompanying gases in the gas supplied to the reaction chamber is usually more than 20 per cent and advantageously more than 40 per cent, for example up to from about 80 to 90 per cent.

The desired concentration of accompanying gases may be maintained by leading the gas through the reaction chamber several times and, after each exit, separating only the constituents which are liquid at a temperature between 0° and 50° C. and under a pressure of about 100 atmospheres. In this way the carbon dioxide formed in the reaction, the formation of which instead of water may be promoted by maintaining certain conditions as regards catalyst, temperature and the like, remains for the greater part in the circulating gas up to a certain concentration dependent on the separation conditions. The unconverted gas and the accompanying gas need not be recycled completely to the reaction space. Also the recirculation of only part of these gases is in many cases of advantage. Again, the said gases need not be recycled to the same reaction space; when operating in several spaces the gases issuing from one space may also be supplied to another space. When in the case of the use of carbon dioxide as accompanying gas the concentration of the latter increased, it dissolves to an increased extent in the water also formed or is finally separated in the liquid form, especially when working under increased pressure. Thus with carbon dioxide a desired concentration of the accompanying gas may be maintained in a very simple manner. When there is insufficient formation of accompanying gases, such gases may be added as such to the circulating gas or to the fresh gas. When the concentration of gases which are not readily separated, such as nitrogen or methane, becomes too great, a part of the circulating gas may be branched off and freed from the accompanying gases.

The said process is of special advantage in the preparation of liquid hydrocarbons from mixtures of carbon monoxide and hydrogen under increased pressure and in the presence of catalysts containing metals of the 8th group of the periodic system of elements, in particular iron. In the presence of the said accompanying gases, the reaction of carbon monoxide and hydrogen proceeds for the most part with the formation of hydrocarbons and carbon dioxide according to the equation: $2xCO + xH_2 = (CH_2)_x + xCO_2$, but water is also formed according to the equation:

$$xCo + 2xH_2 = (CH_2)_x + xH_2O.$$

For the reaction chamber there may be used a simple tube of suitable material in which the catalyst is distributed, preferably in thin layers in order to allow the gas to pass through easily. The reaction chamber may be provided with a suitable heating means for initiating the reaction. Connected to the reaction chamber, if desired after a heat exchanger, is a cooler which cools the gas and also condenses the hydrocarbons liquid at ordinary temperature and the water and a little carbon dioxide. An attached gas-circulating pump conveys the gas back into the reaction chamber, if desired through a heat exchanger and/or a special heating device. The reaction temperature lies between 150° and 500°, preferably between 200° and 400° C. The particular temperature to be employed in each case largely depends on the activity of the catalyst. With very active catalysts lower temperatures are used than with catalysts having only a moderate activity. It is advantageous to use increased pressures of, for example, 5, 10, 20, 50 or 100 to 300 or 500 or more atmospheres.

The circulating gas leaving the reaction chamber, which carries the excess of the heat of reaction with it, consists to a great extent of carbon dioxide and also contains olefines, methane and its homologues, nitrogen, steam and unchanged carbon monoxide and hydrogen.

A special advantage of the process according to this invention consists in the fact that the fresh gas may have a high content of carbon monoxide, as for example from 40 to 70 per cent, and a smaller content of hydrogen than usual, as for example from 60 to 30 per cent, so that the ratio of carbon monoxide to hydrogen need not be 1:2 as usual.

The drawing is a diagrammatic illustration in partial sectional elevation of a suitable device for carrying out the process of this invention and indicates the flow of materials.

Referring to the drawing in detail, the feed gas to be converted is supplied by the pump D and after mixing with recycled gases is passed into the reaction chamber A which contains a number of layers of catalyst B distributed therein. The reaction products pass from the reaction chamber A through a condenser E into a separating chamber F, from which the liquid products are withdrawn. The uncondensed gases are separately withdrawn from the separating chamber and are recycled by the pump C. A portion of the recycled gases may be withdrawn through the valve G.

The following example will further illustrate the nature of this invention but the invention is not restricted to this example. The parts and percentages are by volume.

*Example*

A high-pressure tube having an internal diameter of 80 millimeters and a height of 1 meter, which is externally heated and in which a catalyst consisting of ferrosoferric oxide with an addition of uranium, titanium and potassium compounds (prepared by melting iron powder together with titanium oxide, uranyl nitrate and potassium hydroxide in the proportions by weight of 1000:50:50:5 in a stream of oxygen and reducing with hydrogen at 400° C. in the reaction chamber under a pressure of 150 atmospheres) is distributed in 30 layers, serves as the reaction chamber. Behind the reaction chamber there is arranged a cooler and beneath this a separator for the liquid products. To the gas outlet of the separator there is attached a circulating pump which returns the residual gas to the reaction chamber.

As the fresh gas there is introduced behind the circulating pump a mixture of about 3 parts of carbon monoxide and 2 parts of hydrogen containing about 0.5 per cent of nitrogen. In the whole plant an increased pressure of about 100 atmospheres is maintained; the temperature in the reaction chamber is between about 265° and 300° C. The circulating gas is charged through the reaction chamber at a speed of about 4 cubic meters (calculated under normal conditions) per hour.

The gas introduced into the reaction chamber has the following composition:

| | Per cent |
|---|---|
| $CO_2$ | 51.0 |
| $C_nH_{2n}$ | 2.5 |
| $CO$ | 22.0 |
| $H_2$ | 10.0 |
| $CH_4$ and homologues | 12.0 |
| $N_2$ | 3.0 |

The 12 per cent of methane and homologues consists to the extent of about 20 per cent of homologues.

A very high content of accompanying gases is thus maintained according to this example. The liquid products withdrawn per day consist of 2270 cubic centimeters of oil which according to elementary analysis contains 82.2 per cent of carbon, 13.1 per cent of hydrogen, 0.1 per cent of nitrogen and 4.6 per cent of oxygen. 55 per cent of the liquid product boils between 40° and 200° C. and the remaining 45 per cent between 200° and 350° C. There are also obtained 750 cubic centimeters of acid-reacting water containing about 7.5 per cent of alcohols. In order to remove any excess of accompanying gases, about 1.2 cubic meters per day are withdrawn from the circulating gas. By the separation of the liquid products, carbon dioxide dissolved therein is also removed.

When working in the manner described only 140 liters or from about 92 to 110 grams of methane and gaseous homologues are formed per 2270 cubic centimeters or 1800 grams of oil; i. e. the formation of methane and gaseous homologues amounts to only about 6 per cent of the formation of oil or the conversion of the mixture of carbon monoxide and hydrogen into valuable liquid products amounts to 94 per cent. This is a value which has never been attained by the processes hitherto known.

What we claim is:

1. In the production of hydrocarbons containing more than one carbon atom in the molecule by conversion of carbon monoxide with hydrogen at a temperature between 150° C. and 500° C. and a pressure between 5 and 500 atmospheres, the steps of supplying to the reaction space a mixture of hydrogen, carbon monoxide and an accompanying gas containing essentially carbon dioxide, said gas mixture containing at least four parts by volume of carbon monoxide to each six parts of hydrogen and between 20% and 90% of the accompanying gas, and recycling at least part of the unconverted gas together with at least part of the said accompanying gas to the reaction space.

2. In the process as claimed in claim 1 employing the inert gas in an amount of between 40 and 90 per cent of the gas mixture supplied to the reaction space.

3. In the process as claimed in claim 1 starting from a gas in which the ratio of carbon monoxide and hydrogen is between 4 to 6 and 7 to 3.

EDUARD LINCKH.
FRITZ WINKLER.